US005206193A

United States Patent [19]
Renkey et al.

[11] Patent Number: 5,206,193
[45] Date of Patent: Apr. 27, 1993

[54] HIGH PURITY FUSED GRAIN IN THE SYSTEM $AL_2O_3$-$CR_2O_3$-MGO

[75] Inventors: Albert L. Renkey, Bridgeville; Stanley R. Pavlica, Irwin, both of Pa.

[73] Assignee: Indresco, Inc., Dallas, Tex.

[21] Appl. No.: 810,227

[22] Filed: Dec. 19, 1991

[51] Int. Cl.$^5$ .............................. C04B 35/04
[52] U.S. Cl. ................... 501/117; 501/119; 501/121; 501/132
[58] Field of Search ............ 501/117, 118, 119, 120, 501/121, 132

[56] References Cited

U.S. PATENT DOCUMENTS

| | | | |
|---|---|---|---|
| 1,811,314 | 6/1931 | Haglund | 501/117 |
| 2,051,002 | 8/1936 | Knote | 501/117 |
| 3,132,954 | 5/1964 | Alper et al. | 501/117 |
| 3,615,775 | 10/1971 | Teeter | 501/117 |
| 3,837,870 | 9/1974 | Recasens et al. | 501/104 |
| 4,039,344 | 8/1977 | Nishikawa et al. | 501/104 |
| 4,071,370 | 1/1978 | Davies | 501/114 |
| 4,141,743 | 2/1979 | Grubba | 501/114 |
| 4,354,964 | 10/1982 | Hing et al. | 252/518 |
| 4,490,474 | 12/1984 | Staten | 501/115 |
| 4,561,885 | 12/1985 | McFarlane | 75/30 |
| 4,574,119 | 3/1986 | Perry et al. | 501/114 |
| 4,775,648 | 10/1988 | Bartha et al. | 501/112 |
| 4,999,325 | 3/1991 | Michael | 501/115 |

Primary Examiner—Mark L. Bell
Assistant Examiner—Chris Gallo
Attorney, Agent, or Firm—Baker & Botts

[57] ABSTRACT

High purity fused grain and refractory compositions that contain a high purity fused grain made up of 35 to 85 wt. % chromia, 5 to 55 wt. % alumina, and 5 to 45 wt. % magnesia. Burned refractory brick having such a chemistry was found to unexpectedly possess superior resistance to AOD and electric furnace slags.

8 Claims, 3 Drawing Sheets

HIGH PURITY FUSED GRAIN IN THE SYSTEM AL$_2$O$_3$-CR$_2$O$_3$-MGO

BACKGROUND OF THE INVENTION

This invention relates to high purity refractories and, more particularly, it concerns an improved high purity fused grain made of alumina, chromia and magnesia oxides.

Commercial high purity refractories based upon alumina, chromia, and magnesia, are divided into two groups. One group is based upon picrochromite (MgO·Cr$_2$O$_3$ in amounts of about 80% Cr$_2$O$_3$ and 20% MgO) and the other group is based upon alumina-chromia in various combinations. Grains used to make these refractories are either sintered or fused. Fused grains are preferred due to their low porosity as it is very difficult to sinter high purity inert refractory oxides. Refractories based upon picrochromite are used in high temperature basic environments such as in critical wear areas of some steelmaking furnaces. Refractories based on alumina-chromia and chromia-alumina are used in high temperature more acidic environments such as coal gasifiers.

Many steelmaking or refining vessels have acidic slags initially. Later during the production cycle slag conditions turn basic. A classic example of this is the Argon Oxygen Decarburization (AOD) vessel. A desirable refractory for such applications would contain combinations of all three oxides—magnesia, alumina, and chromia. Such a refractory should have improved resistance to changing slag conditions compared to either end member (MgO-Cr$_2$O$_3$ or A$_2$O$_3$-Cr$_2$O$_3$). Such a refractory should also have improved thermal shock resistance compared to chrome-alumina compositions. A refractory based upon A$_2$O$_3$-Cr$_2$O$_3$-MgO should be a cost effective means for resisting a variety of slags within a given operation. The three component system should allow a decrease in the total chromic oxide level without negatively impacting slag resistance. Lowering the Cr$_2$O$_3$ content of the refractory could significantly lower cost as chromic oxide is by far the most costly ingredient in this system.

U.S. Pat. No. 3,615,775 discloses compositions made from 80 to 95 wt. % alumina and the balance magnesia and chromia. This mixture when fired contained coarse alumina grains having some chromia in solid solution bonded by a MgO-Al$_2$O$_3$-Cr$_2$O$_3$ matrix. U.S. Pat. No. 4,490,474 discloses a fused cast refractory consisting of a uniform mixture of 65 to 98 wt. % Cr$_2$O$_3$, 0.75 to 4 wt. % MgO, and 1 to 34.25 wt. % Al$_2$O$_3$. In both of these references, the magnesia content is so low that the beneficial aspects of a refractory containing higher levels of magnesia could not be realized.

In light of the foregoing, there is a need for an improved high purity refractory which is resistant to both acidic and basic metallurgical slags.

SUMMARY OF THE INVENTION

In accordance with the present invention, it has been unexpectedly discovered that low porosity (less than 15%) refractory brick can be made which essentially consists only of three oxides—alumina, chromia, and magnesia. The ranges of these oxides occur between 35 to 85 wt. % chromia, 5 to 55 wt. % alumina, and 5 to 45 wt. % magnesia. Prior art indicated that compositions within this range would have higher porosity because the oxides, particularly chromia, were thought to be inert and difficult to sinter.

Shapes made from various high purity grains and having an overall chemical composition within the range 35 to 85 wt. % chromia, 5 to 55 wt. % alumina, and 5 to 45 wt. % magnesia were found to have exceptional resistance to both acid and basic metallurgical slags—such as those found in an AOD vessel or a steel ladle.

Accordingly, a principal object of the present invention is to provide a refractory consisting primarily of alumina, chromia, and magnesia oxides, and which can resist a range of metallurgical slags ranging from acidic to basic in their composition.

Another and more specific object of the invention is the provision of a high purity fused grain made of alumina, chromia and magnesia oxides. Other objects and further scope of applicability of the present invention will become apparent from the detailed description to follow taken in conjunction with the accompanying drawings and tables.

DETAILED DESCRIPTION OF THE PREFERRED EMBODIMENT

Figure 1:
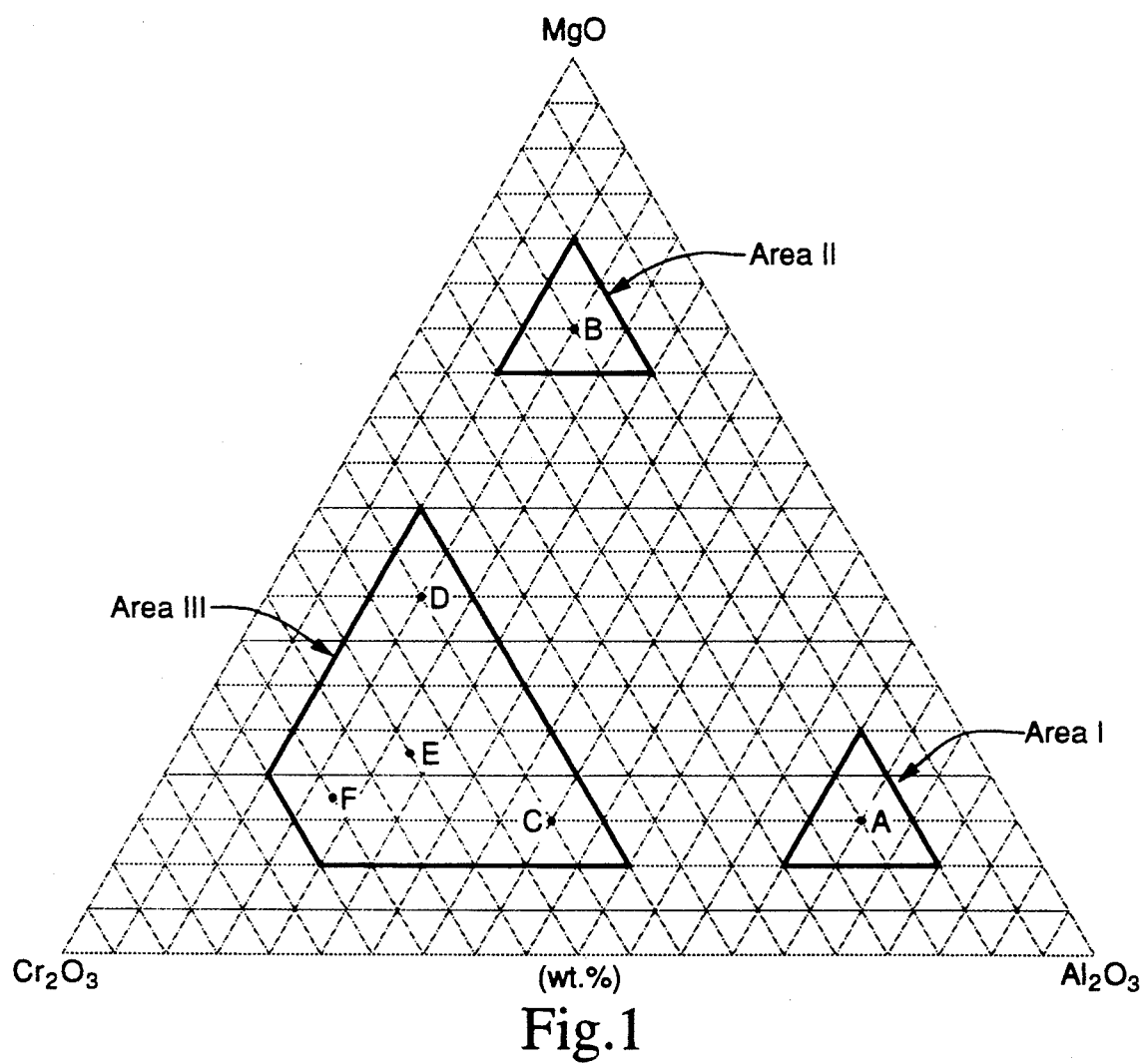
FIG. 1 is a ternary diagram of the mix compositions in the Al$_2$O$_3$-Cr$_2$O$_3$-MgO system.

To determine if some unique compositions existed within the Al$_2$O$_3$-Cr$_2$O$_3$-MgO system, three areas within this system were explored as shown in FIG. 1. Within Area I, a mix A was made which had an analysis of 70 wt. % alumina, 15 wt. % chromia, and 15 wt. % magnesia. This mix is represented by a dot within the center of area I. Likewise, to investigate the magnesia-rich portion of the ternary, a mix B was made which corresponded to the center of Area II (70 wt. % magnesia, 15 wt. % alumina, and 15 wt. % chromia). To explore the chromia-rich portion of this system, four contrasting mixtures were investigated. These mixtures are labelled C, D, E, F, and are found within area III.

To obtain the desired positions within the ternary, mixes (Table I) were formulated using various fused and sintered grains having contrasting levels of alumina, chromia and magnesia. Various levels of fine alumina, chromia and magnesia were blended with the coarse fused grains in order to obtain the desired screen analysis as shown in Table II. The mixes were blended with a temporary binder, such as, 3.3 wt. % lignosulfonate with 0.4 wt. % motor oil, dry pressed into a brick shape, and fired at an elevated temperature, for example, 2810° F. for 10 hours. Some mixes contained a very minor water addition to achieve a pressable consistency.

The physical properties of the brick were then measured (Table III). It is well known that high purity refractory oxides such as the three components in this system are difficult to sinter and produce a shape with low porosity. This occurs because these pure materials, especially chromia, are chemically inert. In spite of this, it was quite unexpected that the two high chromia mixes (Mix E and F) had low apparent porosities near 12.5%. These two compositions also had relatively high hot strength. This further indicates that the shapes had undergone sintering. Mixes B and D had unexpectedly low Modulus of Elasticity (MOE) values. These low MOE values may indicate that these compositions would have excellent thermal shock resistance. It is quite unusual to find fused grain shapes with low MOE values since it is generally accepted that shapes made predominantly from fused grains have poor thermal shock resistance.

To determine the corrosion resistance of the compositions within the system Al $_2$O$_3$-Cr$_2$O$_3$-MgO, a series of slag tests were conducted (Table IV). In an AOD slag test, Mix A with 15% chromia showed over twice as much erosion as the standard composition. The standard used in these tests was a composition called Guidon ®. This standard composition consists essentially of fused magnesia-chrome ore and it has by chemical analysis about 59 wt. % magnesia, 20 wt. % chromia, and 7 wt. % alumina. Mix E, however, was remarkable in its ability to resist the corrosive effects of the AOD slag. It was virtually unaffected in this test.

Mixes B and E did not show any distinctive advantage in a combination ladle slag and degasser slag test. This test was developed to simulate a degasser environment in which early in the operation a basic slag can be drawn into the degasser and later the slag in contact with the refractories is enriched in iron oxide.

In an electric furnace slag test Mixes E and F and to a lesser degree Mixes C and D showed an advantage over the standard. Mixes E and F were remarkable in their ability to resist this slag. However, Mix F in spite of its low erosion loss appeared to be prone to bloating during the test. The tendency of some of these mixes to bloat may be due to fluctuating changes in the valence states of iron oxide.

Figure 2:
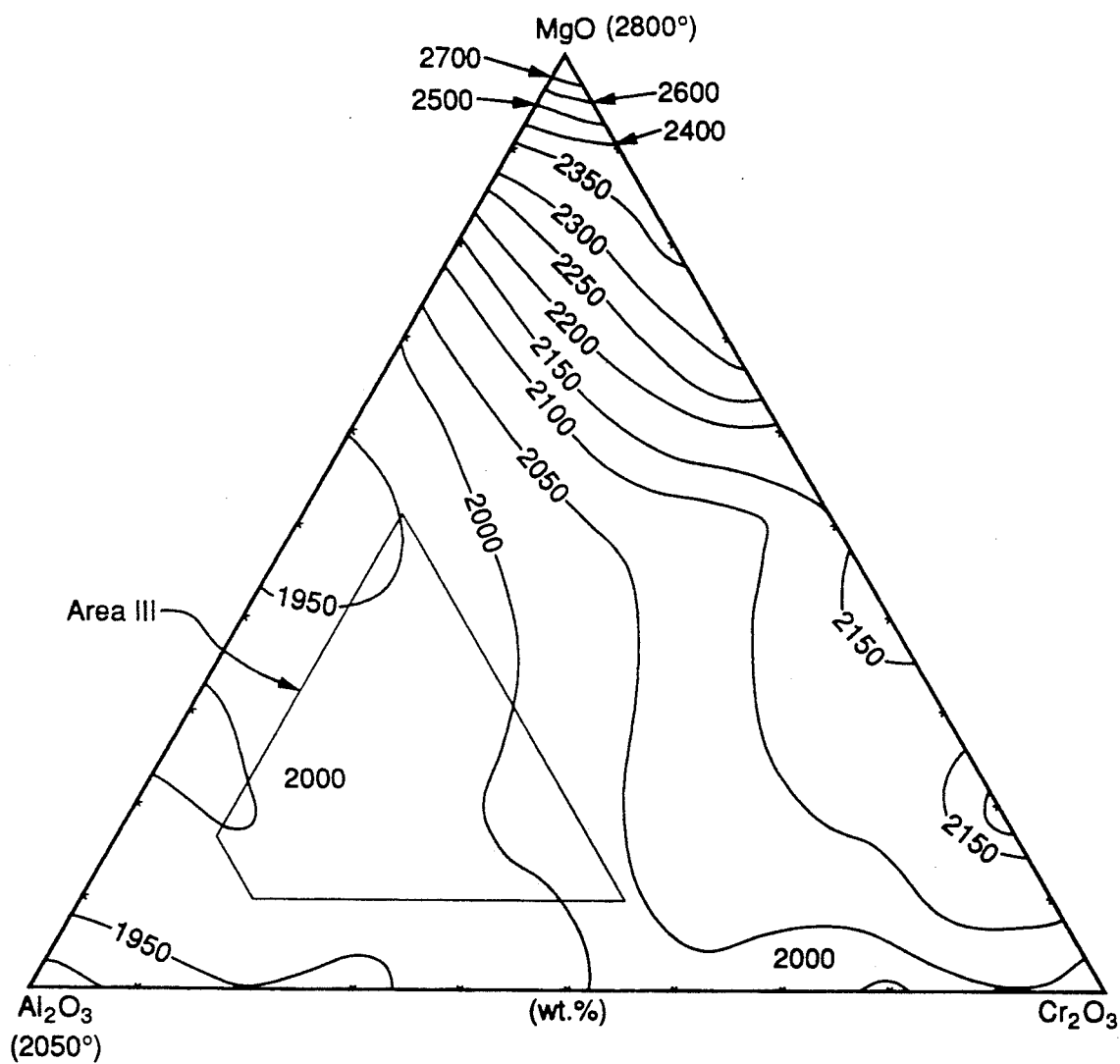
FIG. 2 is a ternary diagram of the melting isotherms of the Al$_2$O$_3$-Cr$_2$O$_3$-MgO system; and, FIG. 3 is a ternary diagram of the isothermal section at 1700°±15° C. of the Al$_2$O$_3$-Cr$_2$O$_3$-MgO system.
Figure 3:
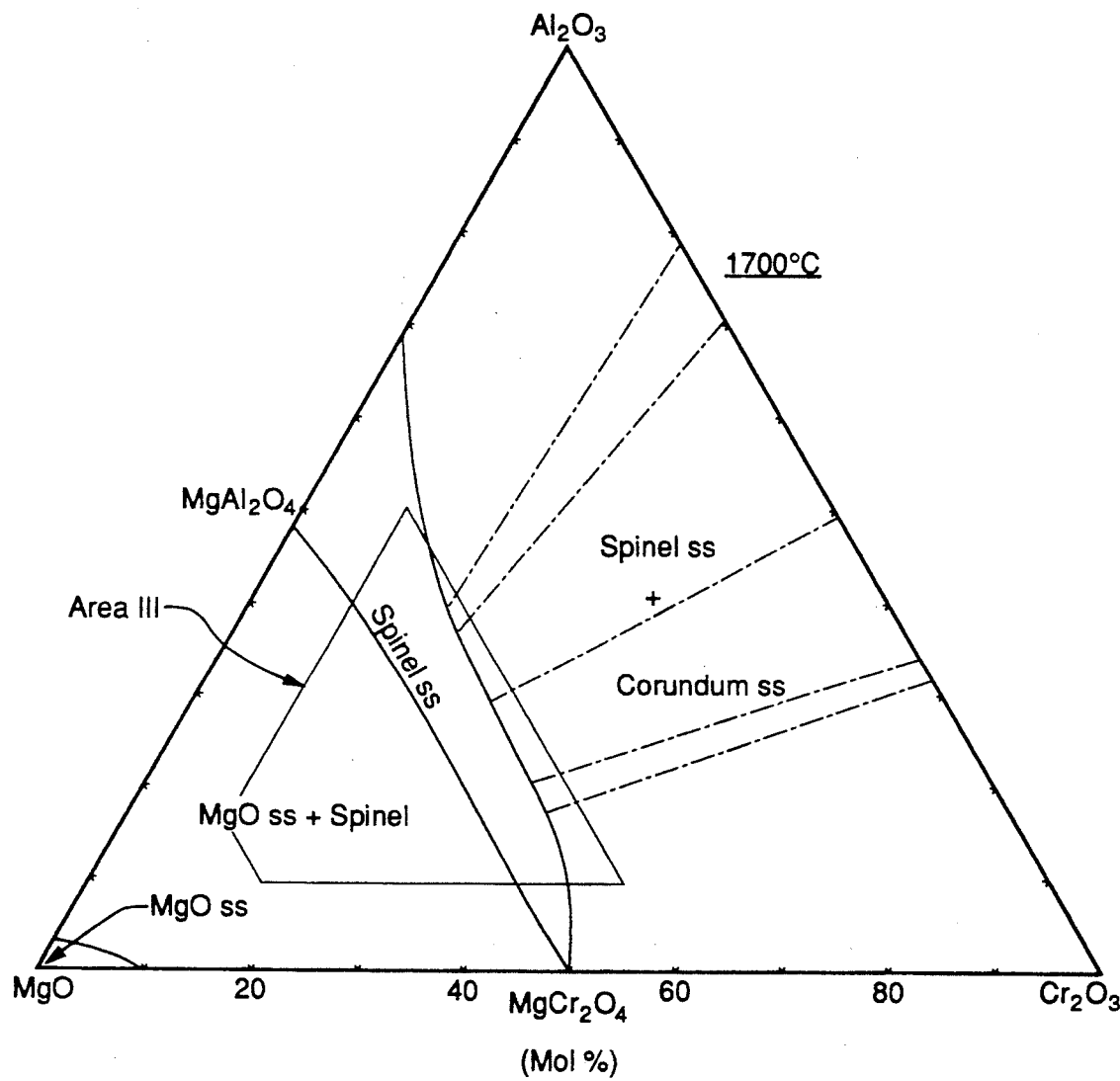

The results of these slag tests clearly show that unique slag-resistant compositions exist within Area III of FIG. 1. Compositions within this area are very refractory as shown by FIG. 2 which indicates compositions within this area having melting points between about 1950°–2050° C. (3542°–3722° F.). FIG. 3 indicates that there are two main phases which are stable at high temperatures in Area III. These phases are a solid solution series between magnesium aluminate and picrochromite and a magnesia phase which contains a solid solution of chromia and alumina. As such, the present invention is directed to the refractory compositions within Area III of FIG. 1 as well as those compositions which lie 5 wt. % on the outside of area III towards all three end members of the ternary diagram.

Table VI shows the chemical analysis of compositions A, B, C, D, E, and F shown in FIG. 1 and described in Tables I–IV.

Thus it will be appreciated that as a result of the present invention, low porosity, high purity refractory brick essentially comprised of chromia, alumina, and magnesia can be manufactured and said refractories are shown to have exceptional resistance to acid as well as basic slags. It is contemplated and will be apparent to those skilled in the art from the foregoing descriptions and accompanying tables that variations and/or modifications of the disclosed embodiment may be made without departure from the invention. Accordingly, it is expressly intended that the foregoing descriptions and accompanying tables are illustrative of a preferred embodiment only, not limiting, and that the true spirit and scope of the present invention be determined by reference to the appended claims.

TABLE I

Mix Studies Within System Al$_2$O$_3$—MgO—Cr$_2$O$_3$

| Mix Within Area (Refer to FIG. 1) | I | II | III | | | |
|---|---|---|---|---|---|---|
| Mix: | A | B | C | D | E | F |
| Fused Grain #1, −4 mesh | 35 wt. % | — | — | — | — | — |
| Fused Grain #2, −6 mesh | 40 | 16 wt. % | 30 wt. % | 18 wt. % | 16 wt. % | — |
| Fused Grain #3, −4 mesh | — | 14.5 | — | 40 | — | — |
| Sintered Coarse 98% Magnesia, −4 mesh | — | 44.5 | — | 15.5 | — | — |
| Fused Grain #4, −4 mesh | — | — | 45 | — | — | 20 wt. % |
| Fused Grain #5, −4 mesh | — | — | — | — | 59 | 55 |
| Sintered Fine 98% Magnesia, 70% −325 mesh | 3 | 16.7 | 5 | 10 | 4.9 | 4.5 |
| Calcined Alumina, −325 mesh | 19 | 4.8 | 9 | 3.5 | 6.3 | 6 |
| Chromic Oxide, −325 mesh | 3 | 3.5 | 11 | 13 | 13.8 | 14.5 |

| | Chemical Analysis of Fused Grains | | |
|---|---|---|---|
| | Alumina | Chromic Oxide | Magnesia |
| Grain #1 | 66 wt. % | 33 wt. % | — |
| Grain #2 | 62 | — | 31 wt. % |
| Grain #3 | — | 79 | 21 |
| Grain #4 | — | 74 | 25 |
| Grain #5 | 10 | 68 | 22 |

TABLE II

Grind Used to Make Mixes A to F

Screen Analysis (Tyler)

| % held on 10 mesh | 22 wt. % |
|---|---|
| 10/28 | 25 |
| 28/65 | 14 |
| −65 | 39 |
| −325 | 25 |

TABLE III

| | Physical Properties | | | | | |
|---|---|---|---|---|---|---|
| Mix: | A | B | C | D | E | F |
| Properties After Firing | | | | | | |
| Bulk Density, pcf: | 196 | 190 | 215 | 201 | 222 | 235 |
| App. Porosity, %: | 18.0 | 17.8 | 16.4 | 18.7 | 12.4 | 12.9 |
| App. Specific Gravity: | 3.81 | 3.67 | 4.09 | 3.95 | 4.04 | 4.30 |
| Modulus of Rupture, psi | | | | | | |
| At Room Temperature: | 2410 | 900 | 1810 | 930 | 1420 | 2330 |
| At 2700° F.: | 380 | 430 | 630 | 390 | 860 | 1410 |

TABLE III-continued

| Mix: | Physical Properties | | | | | |
|---|---|---|---|---|---|---|
| | A | B | C | D | E | F |
| Modulus of Elasticity, psi × $10^6$: | 12.2 | 2.7 | 11.3 | 3.4 | 11.2 | 15.9 |

TABLE IV

Drip Slag Test Results

| Mix: | A | B | C | D | E | F | Comparative Data Guidon |
|---|---|---|---|---|---|---|---|
| Drip Slag Test | | | | | | | |
| At 2950°F. using 1000 g of AOD slag Volume Eroded, cc's: | 70 (Some bloating) | — | — | — | 1 | — | 30 (Cracked) |
| At 2950° F. using 250 g Ladle Slag and then adding 1750 g of Degasser slag Volume Eroded, cc's: | — | 14 | — | — | * | — | 19 (Cracked) |
| At 2900° F. using 1000 g of Electric Furnace slag Volume Eroded, cc's: | — | — | 29 (Moderate bloating) | 27 | 4 | 2¼ (Some bloating) | 37 (Cracked) |

*Sample was severely bloated, could not be measured for erosion loss.

TABLE V

Chemical Analysis of Slags

| Slag Type: | AOD | Ladle | Degasser | Electric Furnace |
|---|---|---|---|---|
| Chemical Analysis (Calcined Basis) | | | | |
| Silica | 43.1 wt. % | 18.5 wt. % | 10.1 wt. % | 34.0 wt. % |
| Alumina | 4.46 | 1.80 | 11.2 | 1.09 |
| Titania | 0.21 | 1.37 | 0.04 | 0.23 |
| Iron Oxide | 2.60 | 21.3 | 71.2 | 18.6 |
| Chromic Oxide | <0.1 | 0.12 | 0.42 | 0.27 |
| Lime | 36.9 | 42.6 | 0.17 | 34.1 |
| Magnesia | 11.3 | 8.04 | 2.08 | 5.97 |
| Manganese Oxide | 0.38 | 4.94 | 4.80 | 5.15 |
| Phosphorous Pentoxide | — | 1.60 | — | 0.45 |
| Alkalies | — | — | — | 0.17 |
| Total | 99.0 wt. % | 100.3 wt. % | 100.0 wt. % | 99.6 wt. % |
| Lime/Silica Ratio | 0.9 | 2.3 | <0.0 | 1.0 |
| Base/Acid Ratio | 1.0 | 2.5 | 0.1 | 1.1 |

TABLE VI

Chemical Analyses

| Position Within FIG. 1 | A | B | C | D | E | F |
|---|---|---|---|---|---|---|
| Chemical Analysis (Calcined Basis) | | | | | | |
| Silica ($SiO_2$) | 0.68 wt. % | 0.7 wt. % | 0.68 wt. % | 0.67 wt. % | 0.47 wt. % | 0.35 wt. % |
| Alumina ($Al_2O_3$) | 68.0 | 15.1 | 39.3 | 15.8 | 22.0 | 17.3 |
| Titania ($TiO_2$) | 1.00 | 0.43 | 0.78 | 0.49 | 0.41 | 0.04 |
| Iron Oxide ($Fe_2O_3$) | 0.99 | 0.50 | 0.80 | 0.52 | 0.43 | 0.12 |
| Lime (CaO) | 0.32 | 0.70 | 0.33 | 0.50 | 0.35 | 0.31 |
| Magnesia (MgO) | 15.7 | 68.4 | 14.7 | 38.4 | 22.2 | 16.7 |
| Chromia ($Cr_2O_3$) | 13.0 | 13.8 | 43.4 | 43.4 | 54.0 | 64.5 |
| Total Analyzed | 99.7 | 99.7 | 100.0 | 99.8 | 99.9 | 99.3 |

We claim:

1. A high purity fused refractory grain consisting essentially of 35 to 85 wt. % chromia, 5 to 55 wt. % alumina, and 5 to 45 wt. % magnesia.

2. The high purity fused grain according to claim 1, in which the grain contains no more than 2 wt. % total impurities.

3. A refractory shape which consisting essentially of a high purity fused grain consisting essentially of 35 to 85 wt. % chromia, 5 to 55 wt. % alumina, and 5 to 45 wt. % magnesia.

4. The high refractory shape of claim 3, wherein the grain contains no more than 2 wt. % total impurities.

5. An improved refractory lining for an Argon Oxygen Decarburization (AOD) vessel which consists essentially of a fused grain made from 35 to 85 wt. % chromia, 5 to 55 wt. % alumina, and 5 to 45 wt. % magnesia.

6. An improved refractory lining for an electric arc furnace which consists essentially of a fused grain made from 35 to 85 wt. % chromia, 5 to 55 wt. % alumina, and 5 to 45 wt. % magnesia.

7. The high purity fused grain according to claim 1, in which the grain contains no more than 1 wt. % total impurities.

8. The refractory shape of claim 3, wherein the grain contains no more than 1 wt. % of total impurities.

UNITED STATES PATENT AND TRADEMARK OFFICE
CERTIFICATE OF CORRECTION

PATENT NO. : 5,206,193

DATED : April 27, 1993

INVENTOR(S) : Renkey et al.

It is certified that error appears in the above-identified patent and that said Letters Patent is hereby corrected as shown below:

Column 1, line 3, in title, change "AL" to --Al--.

Column 1, line 34, after "or", change "A$_2$O$_3$" to --Al$_2$O$_3$--.

Column 1, line 37, after "upon", change "A$_2$O$_3$" to --Al$_2$O$_3$--.

Column 2, line 27, after "the Al" delete the space and "1".

Column 2, line 29, between "C" and "of", delete ".".

Column 2, line 34, delete the space between "Al" and "$_2$O$_3$".

Column 2, line 56, after "F", delete ".".

Column 3, line 9, after "system Al" delete the space and "1".

Column 4, line 1, after "C" delete ".".

after "F" delete ".".

UNITED STATES PATENT AND TRADEMARK OFFICE
CERTIFICATE OF CORRECTION

PATENT NO. : 5,206,193
DATED : April 27, 1993
INVENTOR(S) : Renkey, et. al.

It is certified that error appears in the above-indentified patent and that said Letters Patent is hereby corrected as shown below:

Column 5, Table VI, under "B" delete "0.7 wt.%" and insert --0.75 wt.%--.

Signed and Sealed this

First Day of February, 1994

Attest:

BRUCE LEHMAN

*Attesting Officer*      *Commissioner of Patents and Trademarks*